No. 791,175. PATENTED MAY 30, 1905.
C. K. BALDWIN & L. MOSS.
CONVEYER.
APPLICATION FILED JUNE 5, 1903.
2 SHEETS—SHEET 1.
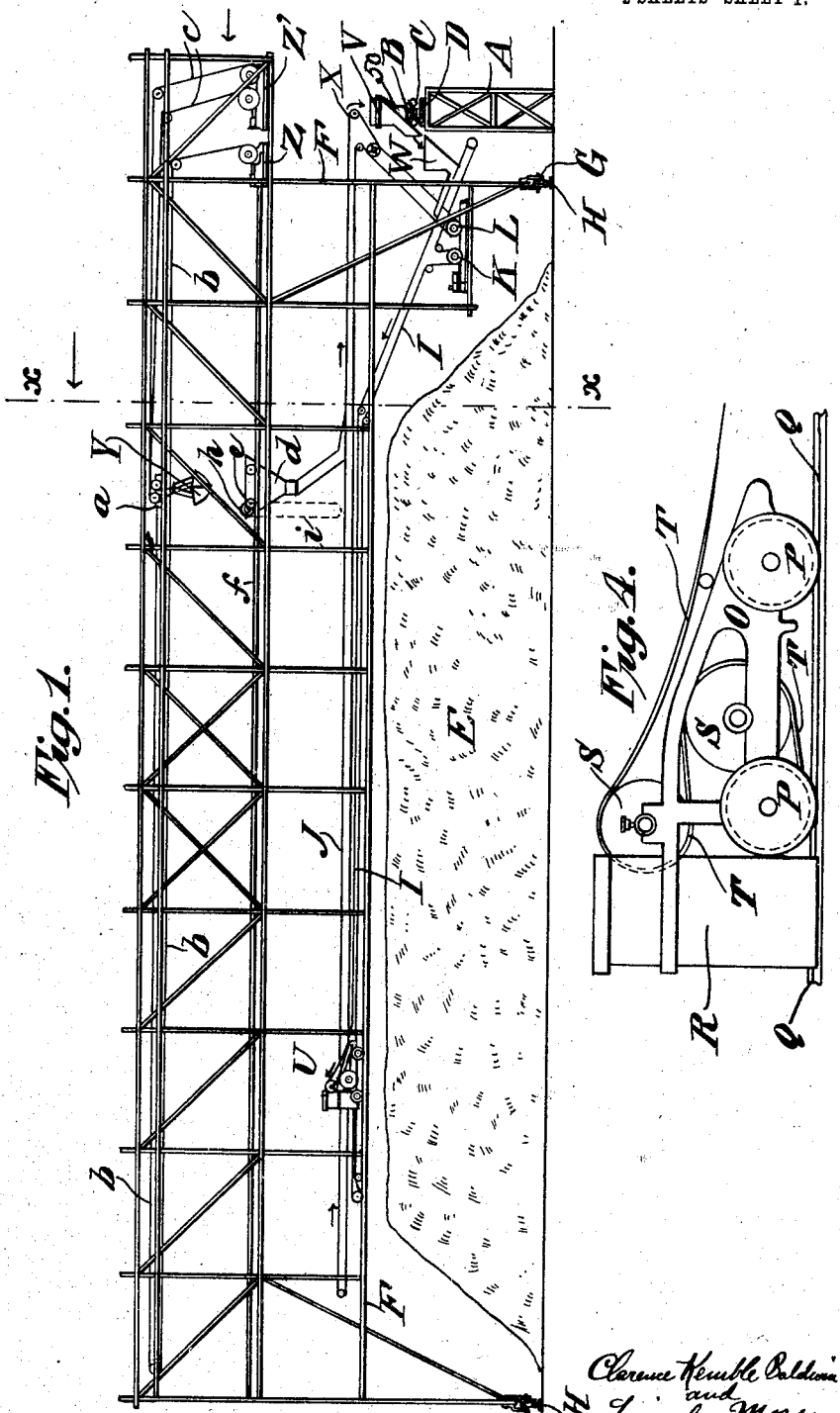

No. 791,175. PATENTED MAY 30, 1905.
C. K. BALDWIN & L. MOSS.
CONVEYER.
APPLICATION FILED JUNE 5, 1903.
2 SHEETS—SHEET 2.
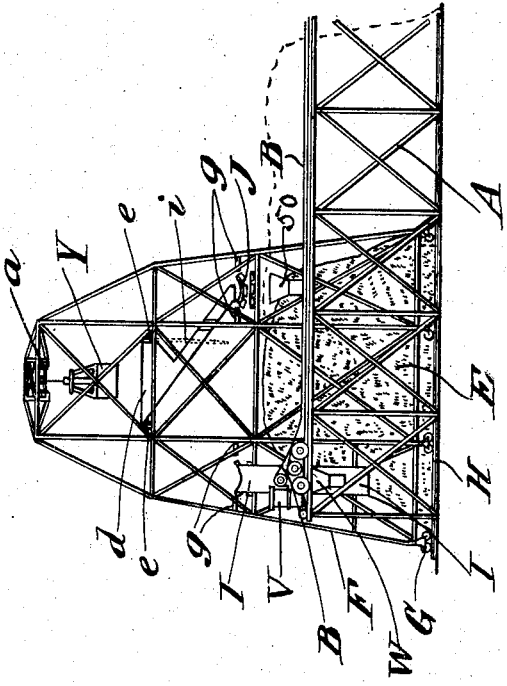
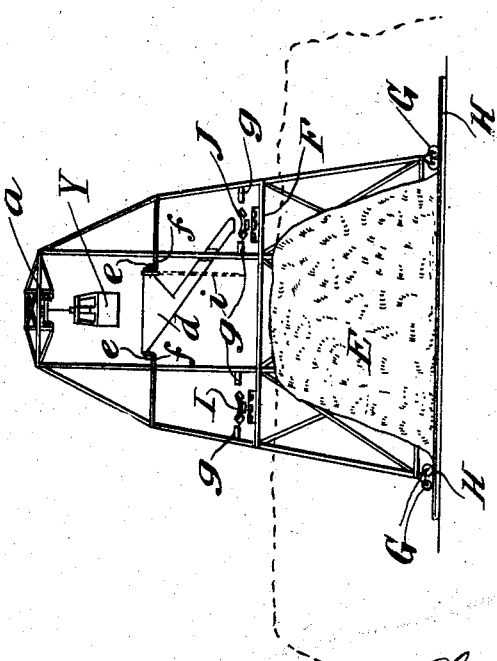

No. 791,175.

Patented May 30, 1905.

UNITED STATES PATENT OFFICE.

CLARENCE KEMBLE BALDWIN AND LINCOLN MOSS, OF NEW YORK, N. Y., ASSIGNORS TO ROBINS CONVEYING BELT COMPANY, OF NEW YORK, N. Y., A CORPORATION OF NEW JERSEY.

CONVEYER.

SPECIFICATION forming part of Letters Patent No. 791,175, dated May 30, 1905.

Application filed June 5, 1903. Serial No. 160,230.

*To all whom it may concern:*

Be it known that we, CLARENCE KEMBLE BALDWIN and LINCOLN MOSS, citizens of the United States, and residents of the borough of Manhattan, city, county, and State of New York, have invented certain new and useful Improvements in Conveyers, of which the following is a specification accompanied by drawings.

This invention relates to improvements in conveyers; and its objects are to enable material to be conveniently handled and delivered upon a stock-pile or put into storage or removed from the stock-pile or storage, as desired.

Further objects of the invention will hereinafter appear; and to these ends the invention consists of apparatus for carrying out the above objects embodying the features of construction, combinations of elements, and arrangements of parts having the general mode of operation, substantially as hereinafter fully described and claimed in this specification and shown in the accompanying drawings, in which—

Figure 1 is a side elevation of the traveling bridge embodied in this invention. Fig. 2 is a sectional end elevation of the bridge, taken on the line $x\ x$ of Fig. 1 and looking in the direction of the arrow. Fig. 3 is an end elevation of the other end of the bridge. Fig. 4 is an enlarged detail side elevation of a form of tripper which may be used in connection with this invention.

Referring to the drawings, A represents a suitable framework upon which is provided a carrier for delivering material, in this instance said carrier being illustrated as a continuous conveyer-belt B, operating upon the idlers C and D. The framework A may extend for a considerable distance longitudinally of the pile E, to which material is to be delivered or from which material is to be carried. In this instance the invention is shown in connection with a pile of material E, forming a dump, although it is to be understood that material may be put into storage or delivered therefrom with the apparatus constructed in accordance with this invention.

Disposed at an angle to the conveyer B are other carriers or conveyers for handling the material delivered from the conveyer B. In this instance a framework or conveyer-bridge F is shown provided with wheels G, running upon the tracks H, and carriers I and J are arranged upon the bridge. In this instance these carriers are shown as continuously-traveling belts, which is a suitable form of conveying apparatus for use in accordance with this invention. The conveyer I is for delivering material from the conveyer B to the pile E, while the conveyer J travels in the opposite direction and is for delivering material from the pile E back upon the conveyer B when the reverse operation is carried out.

Suitable means are provided for actuating the conveyers I and J, in this instance an engine K being connected to drive the conveyer I, while an engine L is connected to drive the conveyer J, these engines, as shown, being supported upon any desired and convenient part of the framework F.

In order to discharge the material from the conveyers, suitable trippers are provided, one form of which is shown in Fig. 4. The framework O is provided with wheels P, running upon the tracks Q. The frame O is also provided with a discharge-hopper R and the upper and lower pulleys S, over which the belt T runs in the form of an ogee curve, so that the material is delivered from the belt into the hopper R. According to this construction it will be seen that the tripper may be moved along the track Q in the direction of the length of the belt and may therefore deliver material from the belt at any desired point. A tripper U is shown in connection with the conveyer I, and another tripper is shown diagrammatically in connection with the conveyer B, in this instance only the discharge-hopper V being indicated in end view, it being understood that material is delivered from the conveyer B into the discharge-hopper V and from thence into the hopper W, suitably supported for delivering material upon the conveyer I. The material may thus be brought from a distance upon the conveyer B and automatically delivered upon the conveyer I and then automatically discharged upon the pile E, or it may be automatically discharged into storage, as desired, according to the class of work being performed. If desired, the dumper or tripper on the bridge may be constructed to move automatically along the same to discharge the material evenly throughout the pile.

As hereinbefore stated, means are provided for reversing the series of operations and moving the material from the pile or from storage and delivering it upon the conveyer B, the direction of travel of which may then be reversed, if desired, and thus the material may be carried to a distance and utilized or discharged in any desired manner. The conveyer J is for delivering the material over the pulley X or stationary dump at one end upon the conveyer B. The intermediate discharge-hopper 50 between the conveyer J and the conveyer B is seen in the end view. In order to deliver material from the pile E upon the conveyer J, means are provided, shown as a bucket Y, connected to be operated from the engines Z Z'. The bucket Y is carried upon a trolley $a$, connected to be operated from the engine Z by means of the rope $b$. The halves of the bucket Y are connected to be operated from the engine Z' through the ropes $c$. An intermediate telescopic hopper $d$ is shown adjustably mounted upon the bridge and movable longitudinally of the same. As shown, the hopper $d$ is provided with the wheels or rollers $e$, running upon the tracks $f$. At each side of the conveyers I and J are arranged the running-platforms $g$, and from one of these platforms the hopper $d$ may be manipulated and moved along the tracks on the bridge as desired. As shown, a gear-wheel $h$ is connected to operate one of the wheels $e$ of the hopper, and a hand-chain $i$ hangs down inside of one of the running-boards $g$. According to this construction the hopper $d$ may be moved along the bridge to any desired point and the bucket Y may be manipulated to deliver material from the pile E directly into the hopper $d$.

According to the apparatus described it will be seen that a great saving of time and labor is obtained, because heretofore if the bucket Y is removing material from the extreme end of the pile E and carrying it to the conveyer B or other equivalent carrier much time is consumed in the travel of the bucket along the length of the bridge between the farther end of the pile and the conveyer at the other end of the bridge. According to this invention, however, it will be seen that a very slight travel is required for the bucket, the principal work being done in the simple vertical movement of the bucket in removing the material from the pile and discharging it into the hopper $d$. A continuous stream of material is delivered from said hopper $d$ upon the conveyer C. It will thus be seen that according to this invention there is a main conveyer embodied in the longitudinally-extending conveyer, which carries material to or takes the material away from the stock-pile, and there are a plurality of other conveyers, which may be termed "secondary" conveyers, disposed at an angle to the main conveyer and relatively adjustable thereto. Operative means connect the main and secondary conveyers in such manner that provision is afforded for removing material from or delivering it to the main conveyer by means of the secondary conveyers. The main conveyer and one of the secondary conveyers are provided with adjustable discharging devices embodied in the trippers, while the other adjustable conveyer is provided with a traveling hopper for delivering material upon said adjustable conveyer.

Obviously some features of this invention may be used without others, and the invention may be embodied in widely-varying forms.

Therefore, without limiting the invention to the construction shown and described nor enumerating equivalents, we claim, and desire to obtain by Letters Patent, the following:

1. In conveying apparatus, the combination of a main conveyer and a plurality of secondary conveyers disposed at an angle thereto, the main conveyer and secondary conveyers being relatively adjustable, and operative means whereby material may be removed from or delivered to said main conveyer by means of the secondary conveyers, for substantially the purposes set forth.

2. The combination with a traveling bridge, of oppositely-moving conveyers thereon, one for delivering material to a pile and the other for removing material from said pile, for substantially the purposes set forth.

3. The combination with a main conveyer, of auxiliary conveyers traveling in opposite directions and adjustable relatively to the main conveyer, and operative devices whereby material may be delivered to or removed from any point of a given area, for substantially the purposes set forth.

4. In conveying apparatus, the combination of two conveyers disposed at an angle to each other, one being adjustable relatively to the other, an adjustable discharging device coöperating with each conveyer, another adjustable conveyer and a traveling hopper therefor, and means for delivering material to said other adjustable conveyer, for substantially the purposes set forth.

5. In conveying apparatus, the combination of three conveyers, two of which are disposed at an angle to the third and are adjustable relatively thereto, adjustable discharging devices for two of the conveyers, a traveling hopper for one of the conveyers, and means for delivering material to said hopper, for substantially the purposes set forth.

6. In conveying apparatus, the combination of a main conveyer, a traveling bridge, conveyers upon said bridge, means for delivering material from the main conveyer to one of those on the bridge, means for delivering material from the other conveyer on the bridge to the main conveyer, a traveling hopper on the bridge, and means for delivering material to said hopper, for substantially the purposes set forth.

7. The combination with a traveling support and a conveyer system carried thereby, said conveyer system comprising a plurality of conveyers, one of said conveyers having a movable deliverer for discharging material at any given point in a given area, of means for removing material from any point in the given area and discharging it upon the other conveyer, for substantially the purposes set forth.

8. In a conveyer system, the combination with a main conveyer and two auxiliary conveyers disposed at an angle thereto and adjustable relatively thereto, of movable means for delivering material from the main conveyer upon one of the auxiliary conveyers, and means for delivering material from one auxiliary conveyer upon the main conveyer, substantially for the purposes set forth.

9. The combination with a traveling support, of oppositely-moving conveyers carried by the support, one of said conveyers being arranged for delivering material to a pile and the other having devices coöperating therewith for removing material from the pile, for substantially the purposes set forth.

10. In a conveyer system, the combination with a main conveyer, of auxiliary conveyers traveling in opposite directions and adjustable relatively to the main conveyer, and devices coöperating with said auxiliary conveyers whereby material may be delivered to or removed from any point in a given area, for substantially the purposes set forth.

In testimony whereof we have signed this specification in the presence of two subscribing witnesses.

CLARENCE KEMBLE BALDWIN.
LINCOLN MOSS.

Witnesses:
M. A. MULCAIRE,
EMIL CHAS. EGER.